Figure 1:
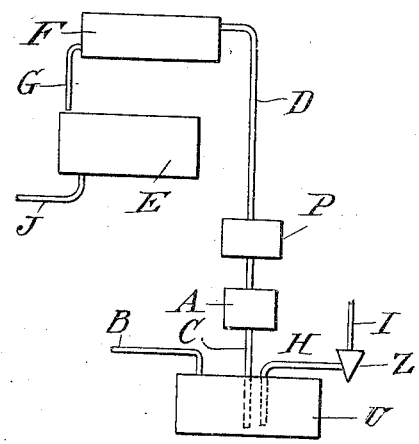

C. W. MERRILL.
PROCESS FOR PRECIPITATING HYDROMETALLURGICAL SOLUTIONS BY MEANS OF AN IMPROVED PRECIPITANT.
APPLICATION FILED JUNE 7, 1910.

1,006,865.

Patented Oct. 24, 1911.

Witnesses:
Edward Rowland.
Charles Engel

Inventor
Charles W. Merrill
By his Attorney
Millard Parker Butler

UNITED STATES PATENT OFFICE.

CHARLES W. MERRILL, OF BERKELEY, CALIFORNIA.

PROCESS FOR PRECIPITATING HYDROMETALLURGICAL SOLUTIONS BY MEANS OF AN IMPROVED PRECIPITANT.

1,006,865.  Specification of Letters Patent.  Patented Oct. 24, 1911.

Application filed June 7, 1910. Serial No. 565,548.

*To all whom it may concern:*

Be it known that I, CHARLES W. MERRILL, a citizen of the United States, and resident of Berkeley, Alameda county, California, have invented a new and useful Improvement in Processes for Precipitating Hydrometallurgical Solutions by Means of an Improved Precipitant, of which the following is a specification.

My invention relates to an improved process in precipitating and recovering valuable materials from solution and particularly metals from hydro-metallurgical solutions.

I have heretofore, in Letters Patent of the United States No. 900,186, granted to me upon the 6th day of October, 1908, described and claimed a process of precipitating and recovering materials from solution, which consisted broadly in adding to the solution to be precipitated a precipitant while in motion, conducting the mixture without rest or without contact with the atmosphere to a filter and then separating the solid from the liquid in said filter. The object of this process was primarily to precipitate and recover materials from solutions by means of the use of zinc bearing materials as precipitants under conditions which make for increased efficiency as compared with earlier processes.

Now I have discovered as a result of the practical application of the invention referred to above, that certain zinc bearing materials which are otherwise desirable to use as precipitants, such as zinc fume or dust, are rendered less efficient and active by reason of the presence of a deterrent coating upon the surfaces of the particles thereof caused in part at least by their well-known property of oxidation. In processes as heretofore conducted, including the above No. 900,186, and particularly in the case of cyanid solutions of feeble activity, and those containing very small amounts of metal to be precipitated, the result of this is to decrease the efficiency of the precipitation because of the fact that this deterrent coating must be dissolved during the process of precipitation before a sufficient contact of the solution and the precipitant results.

The present improvement relates, therefore, to a process of diminishing the time required in earlier processes to remove the deterrent coating formed as above stated, or in other words to remove this coating of oxid previous to the use of precipitant in the process by mechanical means.

The present improved process is conducted substantially in the same manner as the process described in the above Letters Patent and in substantially any form of apparatus applicable in said process.

In the aforesaid Letters Patent I have described a receiver which is provided for the unprecipitated solution, a receiver or mixer for the precipitant, and suitable devices for the conveyance of said solution to a filter. The precipitant may be introduced into the receiver for the unprecipitated solution by means of a suitable duct discharge to a sump at the bottom of the receiver, or it may be led to any point between said receiver, and the discharge of said filter. In any event the mixture received into the filter is there separated into solids which are retained therein and effluent liquid or filtrate which is discharged therefrom.

The type of apparatus preferably employed in conducting the process aforesaid is diagrammatically described in the accompanying sheet of drawings forming part of this specification in which—

Figure 2:
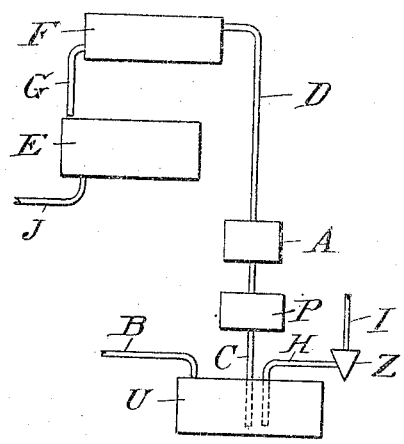

Figure 1 is a diagram showing the devices for the treatment of the precipitant, connected with the suction pipe of the pump; and Fig. 2 a diagram showing the same device connected with the discharge pipe of the pump.

In the diagrams, U is the receiver for the unprecipitated solution and Z is the receiver for the precipitant. I is the pipe through which the precipitant is introduced into the receiver, H is the duct through which the precipitant is conveyed to the unprecipitated solution in motion; C is the suction pipe of the pump; P is the pump and D is the discharge pipe of the same; F is the filter press, shown in this case with the feed inlet at the top and is discharged at the bottom into the receiver E for the precipitated solution by means of the pipe G; J is the discharge pipe from the receiver.

In Fig. 1, A is any suitable grinding apparatus.

Fig. 2 shows the grinding apparatus A connecting with the discharge pipe of the pump.

The precipitant is triturated in any suitable grinding apparatus A whence it is introduced as above. The ordinary form of barrel ball crusher is suitable and if desired the cyanid solution or other liquid which is used to emulsify the precipitant may be mixed with it in the grinding apparatus.

In practice, the grinding apparatus may be interposed at any point between the receiving tank for unprecipitated solution and the filter, or it may discharge under pressure by means of an independent inlet directly to the filter.

In cases of particularly low strength cyanid solutions, or cyanid solutions containing very small amounts of metal to be precipitated, which, under ordinary conditions, are difficult to precipitate by means of metallic replacement, it may be particularly desirable to grind the precipitant in contact with all of the solution to be precipitated thus not only abrading off the deterrent coating, but also increasing the intensity and duration of the agitation of the mixture. That is, to pass all of the solution so to be precipitated through a closed grinding apparatus such as a tube mill preferably interposed between the inlet of a suction pipe of a pump and said pump, or between the point of discharge from said pump and the inlet to said filter, or in case a gravity flow is used, at any point between the receiver for unprecipitated solution and the discharge of the filter.

The method of operation is as follows: The precipitant is fed through the pipe I into the receivers Z; thence it is fed through the pipe H into the tank U. The solution to be treated is fed into the tank U through the pipe B. The pump is continuously operated, and causes the liquid to flow through the suction pipe C and through the discharge pipe D into the filter F whence the filtrate flows through the pipe G into the tank E from which it is discharged through the pipe J into any suitable receptacle. The grinding apparatus A which is shown in Fig. 1 connected with the suction pipe, and in Fig. 2 with the discharge pipe of the pump P, causes the particles of the precipitant to be thoroughly abraded and constantly intermingled with the solution as it passes through the apparatus on its way to the filter. The gist of the present form of treatment consists in the fact that the precipitant is subjected to a mechanical treatment while passing with the solution through the apparatus employed for producing the mechanical treatment.

I do not limit myself to any particular method of, or apparatus for, conducting the unprecipitated solution from the container in which the dissolution takes place to the filter, nor do I limit myself to adding the precipitant at any particular point along the duct through which the effluent unprecipitated solution passes; nor do I limit myself to the use of the precipitant in a liquid or emulsified form, but may add it dry.

In practice, if desired, a liquid may be added to the precipitant before or after it is introduced into the receiver Z, or if an emulsion of the precipitant be used it may be fed directly into the receiver. In case the precipitant is in a dry form, if necessary it may be reduced before the introduction into the receiver to the form of a fine powder.

I claim as my invention:

1. The process for precipitating and recovering material from solution which consists in precipitating the material from said solution while in motion by a suitable precipitant, subjecting the precipitant to mechanical treatment for the removal of any deterrent coating from the surface of the particles thereof, conducting the mixture without rest to a filter, and separating the solid from the liquid in said filter.

2. The process for precipitating and recovering material from solution which consists in adding a suitable precipitant thereto, and while the solution and precipitant are being conveyed to a filter, subjecting the precipitant to mechanical treatment for the removal of any deterrent coating from the surface of the particles thereof, and separating the solid from the liquid in said filter.

3. The process for precipitating and recovering material from solution which consists in conveying said solution to a pressure filter, subjecting the precipitant to mechanical treatment for the removal of any deterrent coating from the surface of the particles thereof, and forcing the precipitant directly into said pressure filter with said solution, and separating the solid from the liquid in said filter.

4. The process for precipitating and recovering materials from solution which consists in adding a suitable precipitant thereto, and while the solution and precipitant are being conveyed to a filter subjecting the precipitant to mechanical treatment for the removal of any deterrent coating from the surface of the particles thereof, forcing the mixture into the top of the pressure filter, and separating the solid from the liquid in said filter.

5. The process for precipitating and recovering material from solution which consists in adding a suitable precipitant to a solution in motion at a point adjacent to the outlet of said solution from a receiver, subjecting the precipitant to mechanical treatment for the removal of any deterrent coating from the surface of the particles thereof, forcing the mixture through a pressure filter, and separating the solid from the liquid in said filter.

6. The process for precipitating and recovering material from solution which consists in adding a suitable precipitant to said solution in motion, subjecting the precipitant to a mechanical treatment for the removal of any deterrent coating from the surface of the particles thereof, conveying the mixture to a filter, and separating the solid from the liquid in said filter, all the while excluding the mixture from contact with the atmosphere.

7. The process for precipitating and recovering material from solution which consists in adding a suitable precipitant to said solution in motion at a point adjacent to the suction pipe of a pump, subjecting the precipitant to mechanical treatment for the removal of any deterrent coating from the surface of the particles thereof, thence pumping the mixture to the top of the pressure filter, and separating the solid from the liquid in said filter.

8. The process for precipitating and recovering material from solution which consists in adding a suitable precipitant to said solution in motion at a point adjacent to the suction pipe of the pump, subjecting the precipitant to mechanical treatment for the removal of any deterrent coating from the surface of the particles thereof, thence pumping the mixture to the top of a pressure filter, separating the solid from the liquid in said filter, all the while excluding the mixture from contact with the atmosphere.

9. The process for precipitating and recovering metals from cyanid solutions which consists in adding an emulsion of a suitable zinc precipitant to said solution while in motion, subjecting the zinc precipitant to mechanical treatment for the removal of any deterrent coating from the surface of the particles thereof, conducting the mixture without rest to a filter, and separating the solid from the liquid in said filter.

10. The process for precipitating and recovering metals from cyanid solutions which consists in adding an emulsion of a suitable zinc precipitant to said solution while in motion, subjecting the zinc precipitant to mechanical treatment for the removal of any deterrent coating from the surface of the particles thereof, conducting the mixture to a filter, and separating the solid from the liquid in said filter, all the while excluding the mixture from contact with the atmosphere.

11. The process of precipitating and recovering metals from cyanid solutions which consists in mixing a suitable zinc precipitant with a liquid in a receiver, adding a liquid continuously to said receiver, discharging the emulsion from said receiver into said solution in motion, subjecting the zinc precipitant to mechanical treatment for the removal of any deterrent coating from the surface of the particles thereof, conducting the mixture without rest to a filter, and separating the solid from the liquid in said filter.

12. The process of precipitating and recovering metals from cyanid solutions which consists in mixing a suitable zinc precipitant with a liquid in a receiver, adding a liquid continuously to said receiver, discharging the resulting emulsion from said receiver into said solution in motion, subjecting the zinc precipitant to mechanical treatment for the removal of any deterrent coating from the surface of the particles thereof, conducting the mixture without rest to the top of the converging pressure filter, and separating the solid from the liquid in said filter.

13. The process for precipitating and recovering metals from cyanid solutions which consists in adding to the solution a suitable metallic precipitant for precipitating gold and other unprecipitated metals, subjecting the metallic precipitant to mechanical treatment for the removal of any deterrent coating from the surface of the particles thereof, conducting the mixture to a filter, and separating the solid from the liquid in said filter.

14. The process for precipitating and recovering metals from cyanid solutions which consists in first adding a zinc precipitant to said solutions, subjecting the zinc precipitant to mechanical treatment for the removal of any deterrent coating from the surface of the particles thereof, conducting the mixture to a filter, and separating the solid from the liquid in said filter.

15. The process for precipitating and recovering metals from cyanid solutions which consists in first adding a zinc precipitant to said solution, subjecting the zinc precipitant to mechanical treatment for the removal of any deterrent coating from the surface of the particles thereof, conducting the mixture without rest to a filter, and separating the solid from the liquid in said filter.

16. The process for precipitating and recovering metals from cyanid solutions which consists in first adding a zinc precipitant to said solution, subjecting the zinc precipitant to mechanical treatment for the removal of any deterrent coating from the surface of the particles thereof, conducting the mixture, excluding the atmosphere therefrom, to a filter, and separating the solid from the liquid in said filter.

17. The process for precipitating and recovering metals from cyanid solutions which consists in first adding finely divided zinc to said solution, subjecting the finely divided zinc to mechanical treatment for the removal of any deterrent coating from the surface of the particles thereof, conducting the mixture without rest and without contact with the atmosphere to a filter, and separating the solid from the liquid in said filter.

In testimony, that I claim the foregoing as my invention, I have signed my name in presence of two witnesses, this third day of June 1910.

CHARLES W. MERRILL.

Witnesses:
    WILLARD PARKER BUTLER,
    CHARLES ENGEL.